United States Patent
Singh et al.

(10) Patent No.: US 11,154,014 B2
(45) Date of Patent: Oct. 26, 2021

(54) AGRICULTURAL BALER WITH SEGMENTED ROLL

(71) Applicant: CNH Industrial America LLC, New Holland, PA (US)

(72) Inventors: Chandrashekhar K. Singh, Lancaster, PA (US); Todd F. Hertzler, Gordonville, PA (US); John R. McClure, New Holland, PA (US); Luke W. Morrie, Leola, PA (US); Joshua Hurst, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 148 days.

(21) Appl. No.: 16/532,647

(22) Filed: Aug. 6, 2019

(65) Prior Publication Data

US 2021/0037715 A1    Feb. 11, 2021

(51) Int. Cl.
*A01F 15/18*    (2006.01)
*A01F 15/07*    (2006.01)

(52) U.S. Cl.
CPC .............. *A01F 15/18* (2013.01); *A01F 15/07* (2013.01); *A01F 2015/077* (2013.01); *A01F 2015/186* (2013.01)

(58) Field of Classification Search
CPC .......... A01F 15/07; A01F 15/08; A01F 15/18; A01F 15/071; A01F 2015/077; A01F 2015/186; A47L 9/0477; A47L 11/18; A47L 11/185; A47L 11/19; A47L 11/4041; B05C 1/08; B05C 11/025; B05C 17/02; B05C 17/0217; B30B 3/005; B30B 3/04

USPC ......... 100/87, 88, 89, 155 R; 492/16–20, 33, 492/44–45
See application file for complete search history.

(56) References Cited

U.S. PATENT DOCUMENTS

| | | | | |
|---|---|---|---|---|
| 2,817,940 A | * | 12/1957 | Lorig | B65H 23/02 226/192 |
| 3,467,002 A | | 9/1969 | Bushmeyer | |
| 3,745,624 A | * | 7/1973 | Newman | B05C 17/02 492/19 |
| 4,198,804 A | * | 4/1980 | Konekamp | A01F 15/07 100/89 |
| 4,248,538 A | * | 2/1981 | Sukup | A01F 25/00 366/261 |
| 5,181,461 A | * | 1/1993 | Viaud | A01F 15/106 100/88 |

(Continued)

FOREIGN PATENT DOCUMENTS

EP    1 466 520 A1    10/2004

*Primary Examiner* — Jimmy T Nguyen
(74) *Attorney, Agent, or Firm* — Peter Zacharias; Patrick Sheldrake

(57) ABSTRACT

A roll for an agricultural baler includes: a cylinder including an outer cylindrical surface and an interior space, the cylinder being at least partially formed by a first end segment and a second end segment held together, the first end segment and the second end segment each having a respective interior wall with a wall opening in the interior space; a connector placed in each wall opening and bearing against the respective interior walls of the first end segment and the second end segment to hold the first end segment and the second end segment together; and a plurality of loops extending from the outer cylindrical surface.

20 Claims, 15 Drawing Sheets

(56) References Cited

U.S. PATENT DOCUMENTS

| | | | | |
|---|---|---|---|---|
| 6,044,556 A | * | 4/2000 | Petitfrere | A01F 15/07 29/895.211 |
| 6,402,672 B2 | | 6/2002 | Mornet et al. | |
| 6,510,579 B1 | * | 1/2003 | Gartner | B05C 17/02 15/230.11 |
| 9,010,071 B2 | | 4/2015 | Claeys et al. | |
| 2008/0184691 A1 | * | 8/2008 | Horchler | A01F 15/18 56/341 |
| 2018/0064031 A1 | * | 3/2018 | Simmons | A01F 15/18 |

* cited by examiner

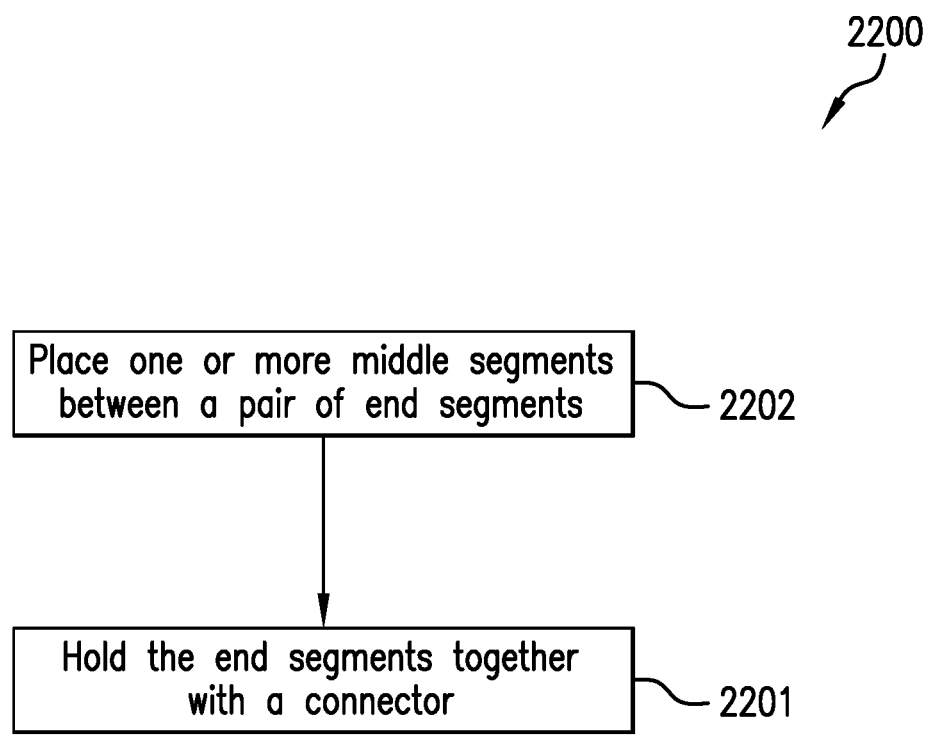

AGRICULTURAL BALER WITH SEGMENTED ROLL

FIELD OF THE INVENTION

The present invention pertains to agricultural vehicles and, more specifically, to agricultural balers.

BACKGROUND OF THE INVENTION

For many years harvesters, such as agricultural balers, have been used to consolidate and package crop material to facilitate the storage and handling of the crop material for later use. Usually, a mower-conditioner cuts and conditions the crop material for windrow drying in the sun. When the cut crop material is properly dried, a harvester, such as a round baler, travels along the windrows to pick up the crop material and form it into cylindrically-shaped round bales.

More specifically, the cut crop material is gathered at the front of the baler from along the ground, onto a pickup assembly, and introduced into a baling chamber within the baler. Inside, the cut crop is rolled up into a predetermined size. A conventional baling chamber may include a pair of opposing sidewalls with a series of belts, chains, and/or rolls that rotate and compress the crop material into the cylindrically-shaped round bale. When the predetermined size is achieved, the cylindrically-shaped round bale is wrapped and bound by wrapping material, such as net wrapping, plastic wrapping, and/or wire. After the round bale is wrapped, the back of the baler, or tailgate, opens and the wrapped bale is discharged.

Round balers are generally provided with a sledge assembly to assist in rolling gathered material into a bale and forming the core of the bale. Sledge assemblies may include, for example, a pivot roll, a stripper roll, and a follower roll. To reduce the risk of crop that accumulates behind the belts in the follower roll area from on the rolls, a dual follower roll configuration may be used that has a smooth follower roll in front and a looped follower roll behind the smooth follower roll.

While such balers are effective, the tendency to increase the width of the baling chamber to produce wider bales has increased the fatigue on certain elements of the baler. In some scenarios, certain elements must be completely resized to account for the additional width, which makes retrofitting the elements to existing balers difficult.

What is needed in the art is a baler that can address at some of the previously described issues with known balers.

SUMMARY OF THE INVENTION

Exemplary embodiments disclosed herein provide a roll, such as a follower roll, including a pair of end segments held together from the inside to form the roll.

In some exemplary embodiments provided according to the present disclosure, a roll for an agricultural baler includes: a cylinder including an outer cylindrical surface and an interior space, the cylinder being at least partially formed by a first end segment and a second end segment held together, the first end segment and the second end segment each having a respective interior wall with a wall opening in the interior space; a connector placed in each wall opening and bearing against the respective interior walls of the first end segment and the second end segment to hold the first end segment and the second end segment together; and a plurality of loops extending from the outer cylindrical surface.

In some exemplary embodiments provided according to the present disclosure, an agricultural baler includes a chassis, a baling chamber carried by the chassis, and a roll disposed in the baling chamber. The roll includes: a cylinder including an outer cylindrical surface and an interior space, the cylinder being at least partially formed by a first end segment and a second end segment held together, the first end segment and the second end segment each having a respective interior wall with a wall opening in the interior space; a connector placed in each wall opening and bearing against the respective interior walls of the first end segment and the second end segment to hold the first end segment and the second end segment together; and a plurality of loops extending from the outer cylindrical surface.

One possible advantage that may be realized by exemplary embodiments disclosed herein is that the roll can be formed without welding segments together in order to increase the length of the roll without concentrating stress at weld points.

Another possible advantage that may be realized by exemplary embodiments disclosed herein is that the segments can be modular to provide rolls, such as follower rolls, of varying lengths.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings:

FIG. 22 is a flow chart illustrating an exemplary embodiment of a method for manufacturing a roll, in accordance with the present disclosure.

DETAILED DESCRIPTION OF THE INVENTION

Figure 1:
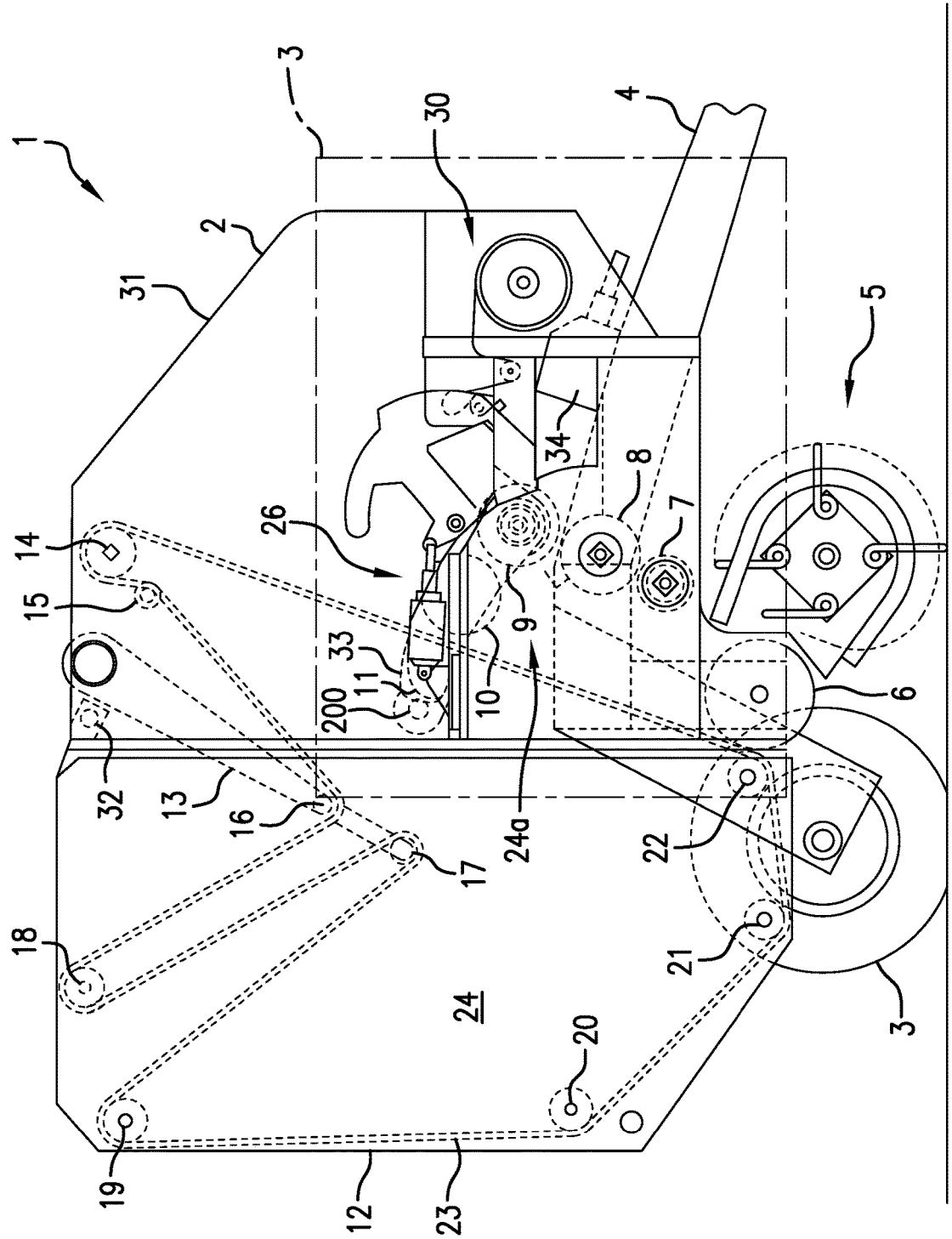
FIG. 1 illustrates a sectional view of an exemplary embodiment of an agricultural baler including a roll, provided in accordance with the present disclosure.
Figure 2:
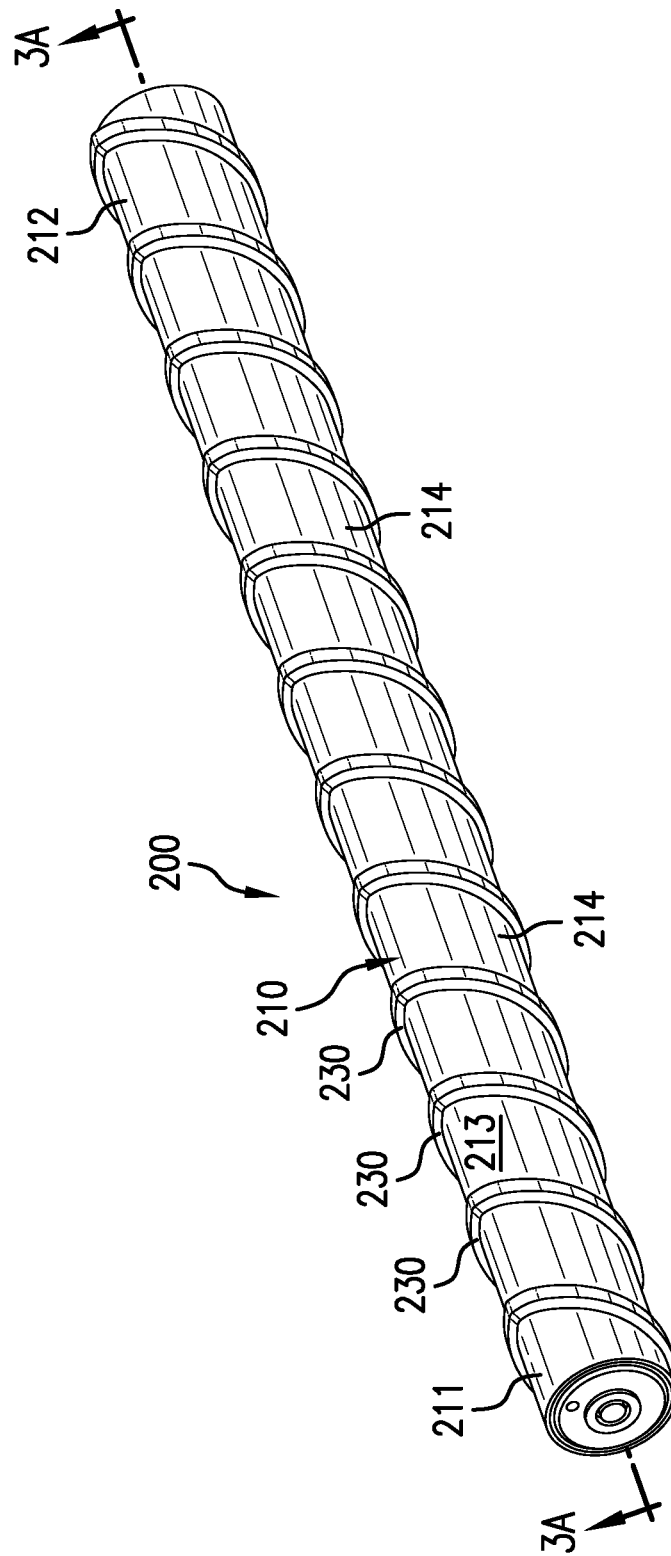
FIG. 2 is a perspective view of an exemplary embodiment of a roll provided in the form of a follower roll in accordance with the present invention.

FIG. 1 illustrates an agricultural baler 1, illustrated as a round baler, with a baling chamber 24a ready to receive crop material. The round baler 1 is attached to a tractor by a tongue 4. Rotational power from the tractor's power-take-off shaft is transmitted to a gearbox 34 via a drive shaft. This is the source of power to operate the round baler. It is also possible that a hydraulic motor and pump arrangement may be used.

The round baler 1 has a chassis 2 supported by a pair of wheels (only one shown) 3. A pickup 5 is positioned in front of the wheels 3. The baling chamber 24a is defined by a pair of opposing baling chamber sidewalls 24 and a series of rubber belts defining an apron 23. Further defining the baling chamber 24a is a floor roll 6, a starter roll 7 and a stationary dimple roll 8 and a sledge assembly 26. The baling chamber 24a has a tailgate 12 that pivots about a tailgate pivot 32 to separate the tailgate 12 from a front portion 31 of the baler 1. The sledge assembly 26 includes a pair of sledge arms 33 between which rotatably extend a lower, pivot roll 9, a middle, stripper roll 10, an upper, first follower roll 11, and a second follower roll 200 placed behind the first follower roll 11. The first follower roll 11 may be a smooth roll and the second follower roll 200 may be a looped roll, as will be described further herein. The sledge assembly 26 is rotatable about an axis which coincides with the axis of the pivot roll 9.

The series of rubber belts or apron 23 encircle the sledge follower roll 11, a drive roll 14, a backwrap roll 15, a front serpentine roll 16, a rear serpentine roll 17, a top/front tailgate idler roll 18, a top/rear tailgate idler roll 19, a middle tailgate idler roll 20, a bottom tailgate idler roll 21 and a nose idler roll 22. The length of the apron 23 is adjusted by a pivoting serpentine take up arm 13. The serpentine take up arm 13 rotates clock wise as the crop material enters the baling chamber 24a and increases the length of the apron 23 as the size of a bale increases.

Generally, the tractor pulls the baler 1 over a windrow of previously cut crop. The pickup 5 inserts the crop between the floor roll 6 and the starter roll 7 into the baling chamber 24a. As more crop material enters the bale chamber 24a, the serpentine take up arm 14 and sledge assembly 26 rotate clockwise to allow additional crop material to enter the chamber 24a while ensuring that proper pressure is maintained on the bale. When the bale chamber 24a is full, a bale wrapping system 30 engages and wraps the bale. Once the bale is wrapped, the tailgate 12 raises and ejects the bale from the baling chamber 24a and away from the round baler 1 and tractor.

As baling chambers become wider, associated rolls, such as follower rolls, have become longer to span the entire width of the chamber. In dual follower rolls assemblies, looped follower rolls rotate in conjunction with smooth follower rolls to reduce the risk of crop material wrapping around the rolls. Known follower rolls with loops are generally formed by welding loop sections to the outer diameter of a cylinder. While the welds are effective to secure the loops to the cylinder, welding the loops to the cylinder tends to weaken material of the cylinder at the weld spots. As the rolls increase in length, such as to 5 feet (1.5 meters) or longer, the welds cause a stress concentration in the roll that will cause the roll to fail in rotational bending fatigue, regardless of a thickness of the cylinder wall. One way that has been proposed to solve this issue is by increasing an outer diameter of the roll, but this is not an attractive solution due to the complexity in common associated parts.

To address some of the previously described issues, and referring now to FIGS. 2 and 3A-3C, an exemplary embodiment of a follower roll 200 provided according to the present disclosure includes a cylinder 210 formed at least partially by a first end segment 211 and a second end segment 212 that are held together by a connector 220 and a plurality of loops 230 extending from an outer cylindrical surface 213 of the cylinder 210. In some embodiments, the cylinder 210 also includes one or more middle segments, illustrated as two middle segments 214, that are held between the end segments 211, 212. The cylinder 210 may have an outer diameter OD of, for example, 4.5 inches (11.4 centimeters) and a length of 5 feet. The cylinder 210 may comprise a metal, such as steel. It should be appreciated that while the roll 200 is described and illustrated as a follower roll provided as part of a sledge assembly, the roll 200 may be placed at a different location such as a nose roll location.

Figure 3A:
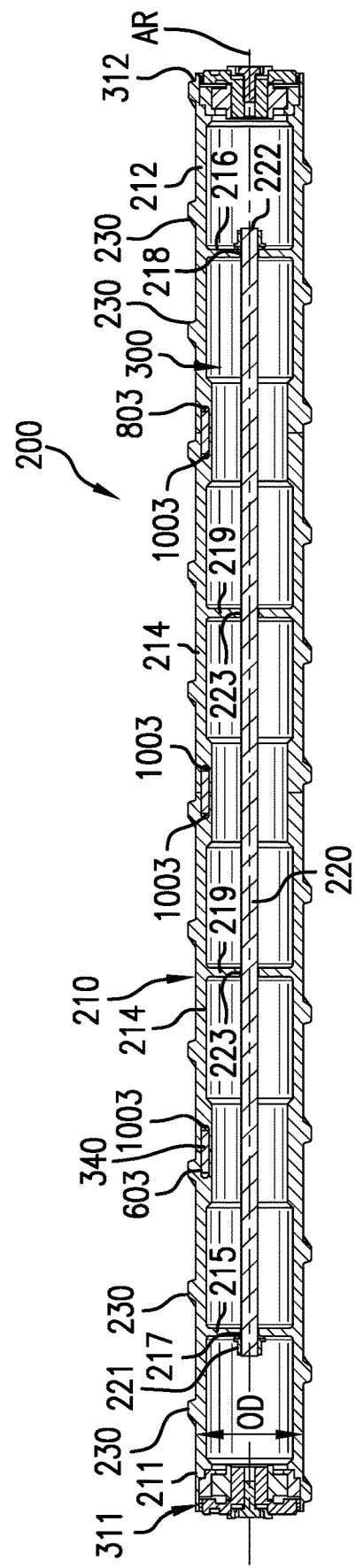
FIG. 3A is a cross-sectional view of the follower roll of FIG. 2 taken along line 3A-3A.
Figure 3B:
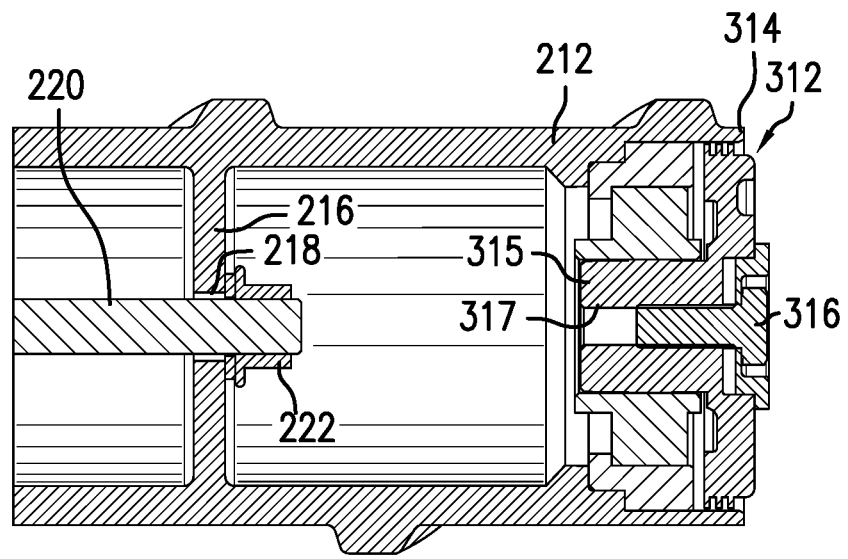
FIG. 3B is a close-up cross-sectional view of a portion of the follower roll of FIGS. 2 and 3A.
Figure 3C:
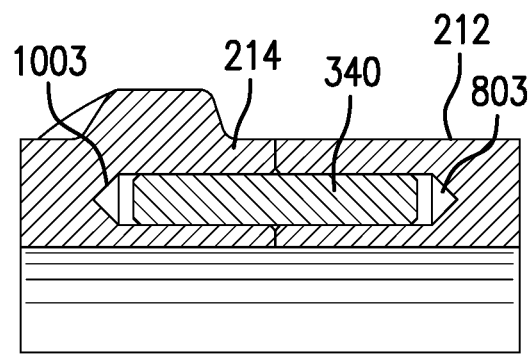
FIG. 3C is a close-up cross-sectional view of another portion of the follower roll of FIGS. 2 and 3A.

Referring specifically now to FIGS. 3A-3C, it is illustrated that the cylinder 210 has an interior space 300, i.e., the cylinder 210 is at least partially hollow. Each of the end segments 211, 212 has a respective interior wall 215, 216. Each of the interior walls 215, 216 has a respective wall opening 217, 218 in the interior space 300. The connector 220 is placed in each of the wall openings 217, 218 and bears against the interior walls 215, 216 of each end segment 211, 212 to hold the end segments 211, 212, and optional middle segments 214, together. The connector 220 may be, for example, a tie rod or similar construction having a pair of end compressors 221, 222 that each bear on a respective one of the interior walls 215, 216 and act to force the interior walls 215, 216 toward one another to hold the segments 211, 212, 214 together. When middle segments 214 are included, each of the middle segments 214 may include a respective middle interior wall 219 that has a middle wall opening 223. The connector 220 may also extend through the middle wall openings 223, which may be aligned with the wall openings 217, 218 of the interior walls 215, 216 of the end segments 211, 212. In some embodiments, the connector 220 extends coaxially with an axis of rotation AR of the cylinder 210.

A bearing and cap assembly 311, 312 may be placed at each end 313, 314 of the cylinder 210. In some embodiments, the bearing and cap assemblies 311, 312 are similar and include a capping portion 315 with a bearing portion 316 journalled in an opening 317 of the capping portion 315. The axis of rotation AR of the cylinder 210 may be defined through the bearing portion 316. Such assemblies are known, so further description is omitted for the sake of brevity.

Figure 4:
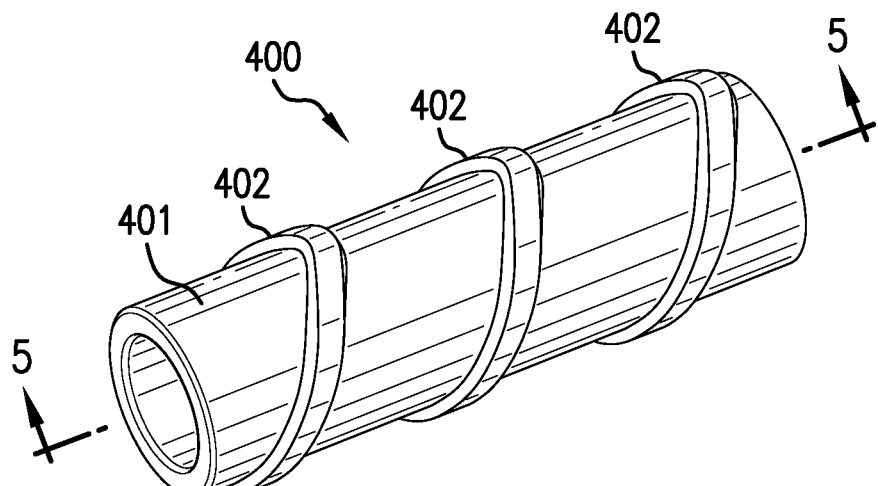
FIG. 4 is a perspective view of an exemplary embodiment of a segment casting that can be modified to form various segments of the follower roll of FIG. 2, in accordance with the present disclosure.
Figure 5:
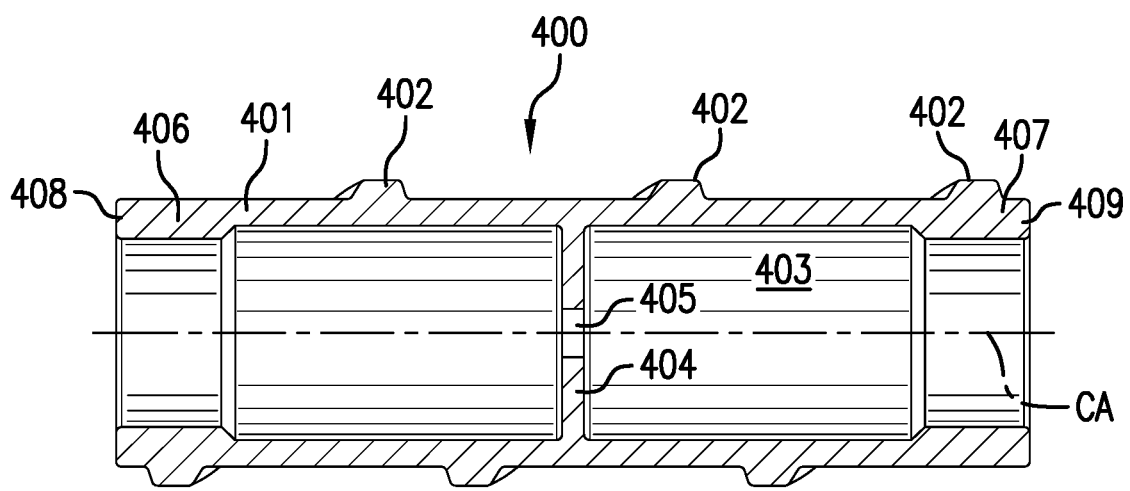
FIG. 5 is a cross-sectional view of the segment casting of FIG. 4 taken along line 5-5.

To produce the segments 211, 212, 214 illustrated in FIGS. 2 and 3A-3C, and referring now to FIGS. 4 and 5, a segment casting 400 may be provided. The segment casting 400 may be, for example, a casted metal, such as steel, that is further processed, such as by machining, to produce the segments 211, 212, 214. The segment casting 400 may include a cylindrical portion 401 that has the shape of a cylinder and one or more loop portions 402 that have the shape of a loop and are integrally formed with the cylindrical portion 401, e.g., by being cast with the cylindrical portion 401. Referring specifically to FIG. 5, it can be appreciated that the segment casting 400 may have an interior space 403 and an interior wall 404 with a wall opening 405 in the interior space 403. The segment casting 400 may also have thickened portions 406, 407 formed at each respective end 408, 409 of the segment casting 400, the significance of which will be described further herein. Each of the ends 408, 409 may be a generally planar end that is perpendicular to a cylinder axis CA of the segment casting 400.

Figure 6A:
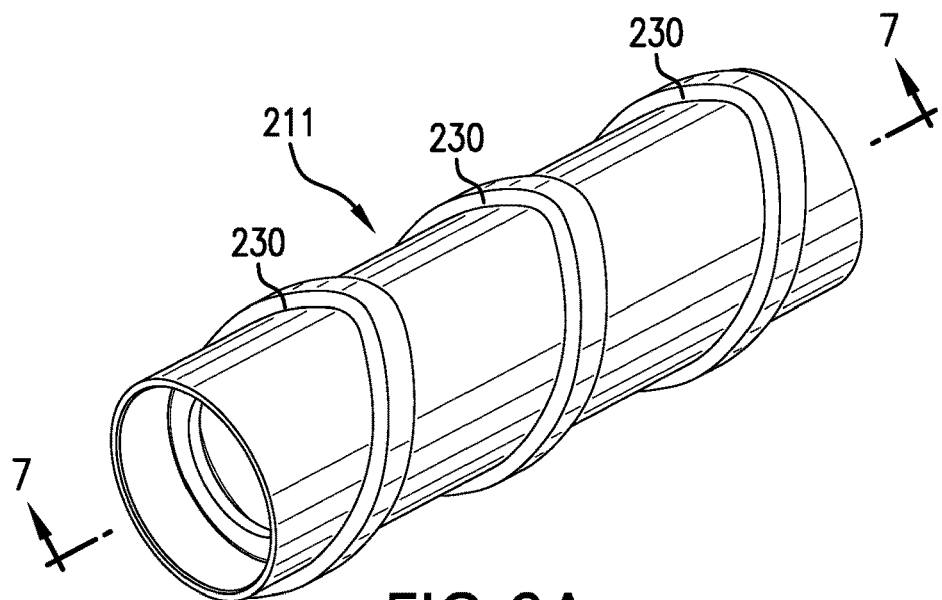
FIG. 6A is a perspective view of an exemplary embodiment of a first end segment of the follower roll of FIG. 2 that is formed from the segment casting of FIG. 4, provided in accordance with the present disclosure.
Figure 6B:
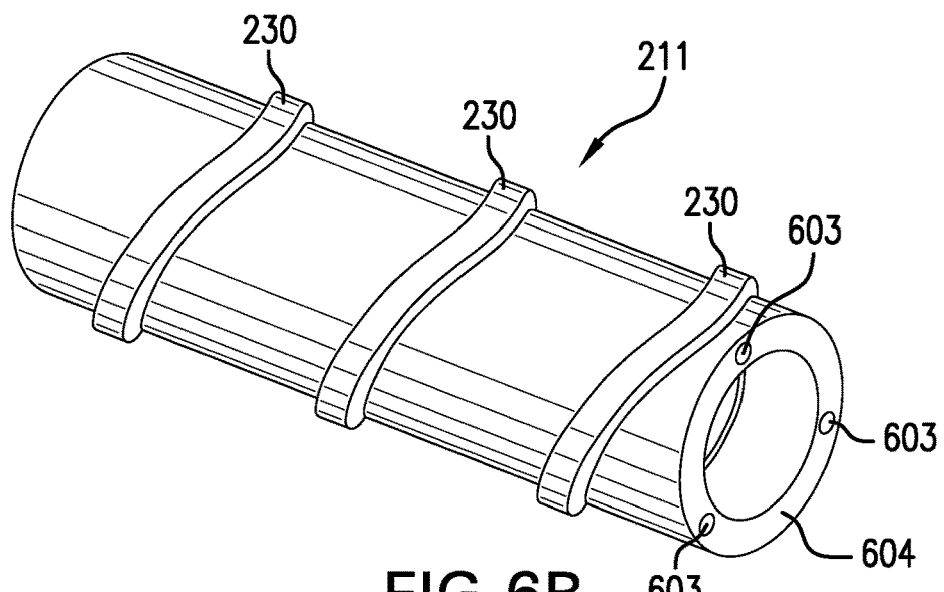
FIG. 6B is another perspective view of the first end segment of FIG. 6A.
Figure 7:
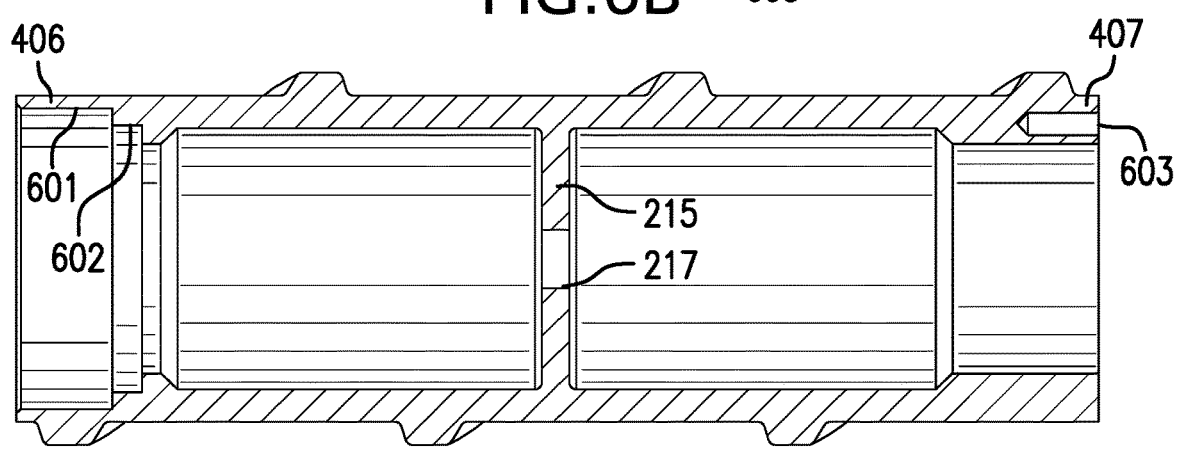
FIG. 7 is a cross-sectional view of the first end segment of FIGS. 6A and 6B taken along line 7-7 of FIG. 6A.

Referring now to FIGS. 6A, 6B, and 7, the first end segment 211 of the cylinder 210 is illustrated in greater detail. To produce the first end segment 211 from the segment casting 400, the thickened portion 406 may be machined to have a pair of mounting grooves 601, 602 for holding the bearing and cap assembly 311. The mounting grooves 601, 602 may be formed, for example, by a side boring operation. At the other thickened portion 407, a plurality of pin openings 603 may be formed in an end face 604 of the first end segment 211 to hold dowel pins 340 (illustrated in FIGS. 3A and 3C), as will be described further herein. It should thus be appreciated that the first end segment 211 can be produced from the segment casting 400 utilizing a variety of simple machining techniques.

Figure 8A:
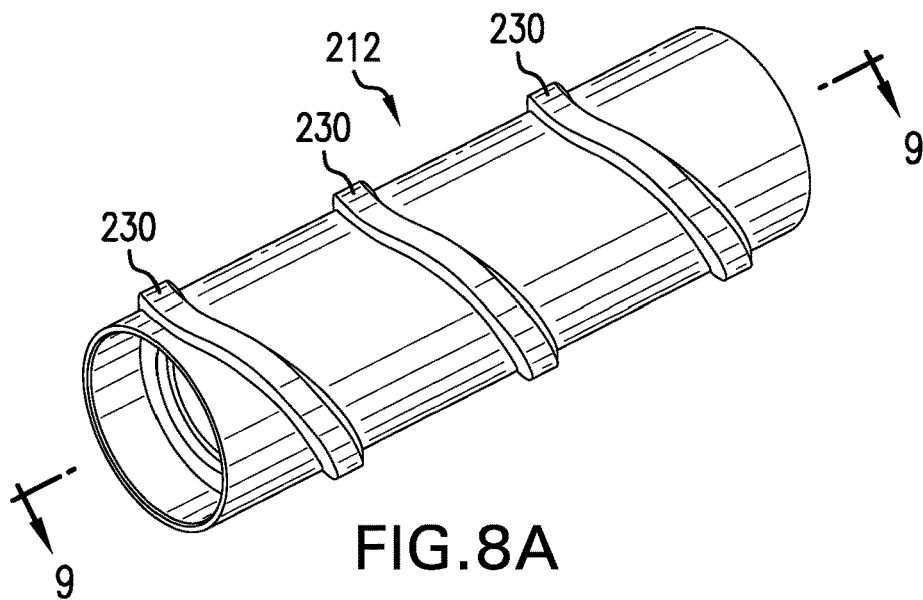
FIG. 8A is a perspective view of an exemplary embodiment of a second end segment of the follower roll of FIG. 2 that is formed from the segment casting of FIG. 4, provided in accordance with the present disclosure.
Figure 8B:
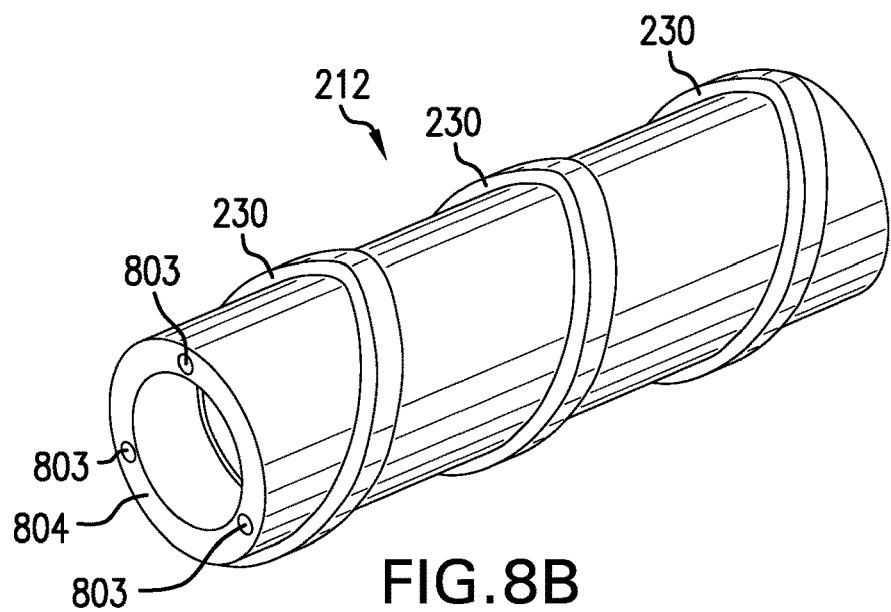
FIG. 8B is another perspective view of the second end segment of FIG. 8A.
Figure 9:
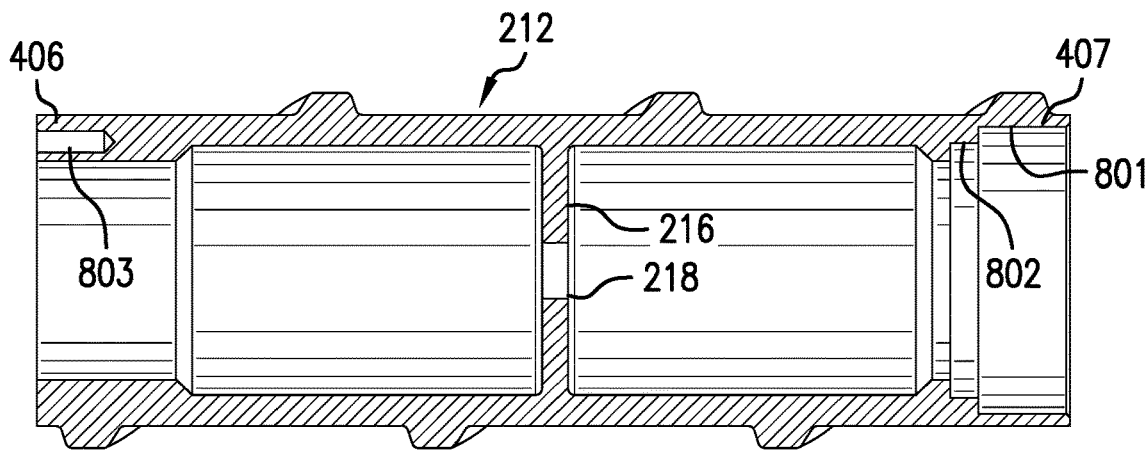
FIG. 9 is a cross-sectional view of the second end segment of FIGS. 8A and 8B taken along line 9-9 of FIG. 8A.

Referring now to FIGS. 8A, 8B, and 9, the second end segment 212 of the cylinder 210 is illustrated in greater detail. To produce the second end segment 212 from the segment casting 400, the thickened portions 406, 407 may be subjected to the opposite machining processes as described previously with respect to the first end segment 211, i.e., mounting grooves 801, 802 may be formed in the thickened portion 407 and pin openings 803 may be formed in an end face 804 at the thickened portion 406. The segment casting 400 may be processed in such a manner so the loops 230 of the formed roll 200 extend about the cylinder 210 in the same direction.

Figure 10A:
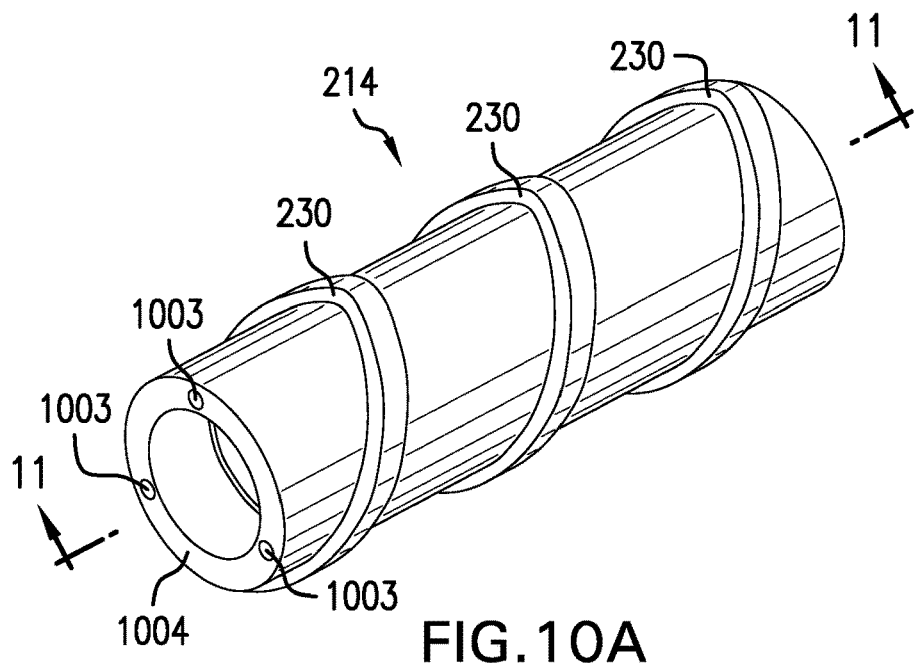
FIG. 10A is a perspective view of an exemplary embodiment of an optional middle segment of the follower roll of FIG. 2 that is formed from the segment casting of FIG. 4, provided in accordance with the present disclosure.
Figure 10B:
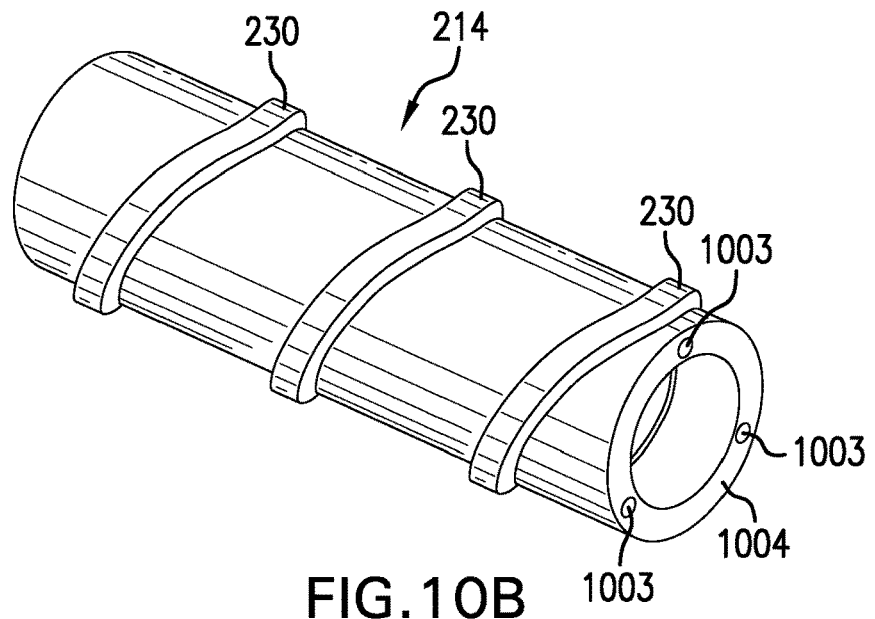
FIG. 10B is another perspective view of the middle segment of FIG. 10A.
Figure 11:
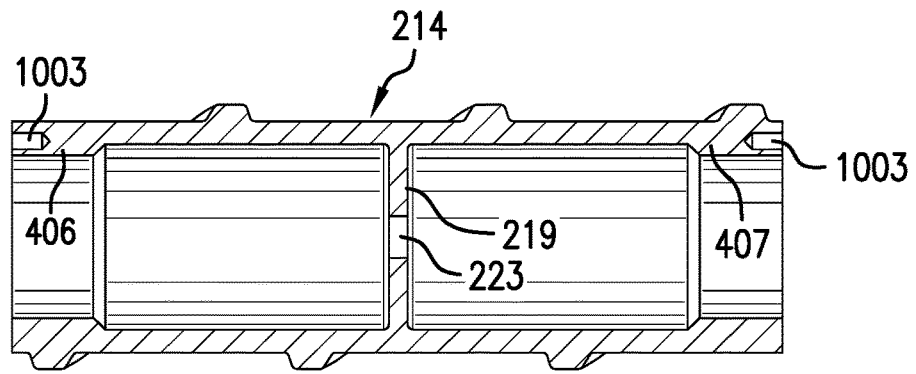
FIG. 11 is a cross-sectional view of the middle segment of FIGS. 10A and 10B taken along line 11-11 of FIG. 10A.

Referring now to FIGS. 10A, 10B, and 11, one of the middle segments 214 of the cylinder 210 is illustrated in greater detail. To produce the middle segment 214 from the segment casting 400, pin openings 1003 may be formed in each end face 1004 at the thickened portions 406, 407 because the middle segment 214 does not hold a bearing and cap assembly 311, 312. Otherwise, the middle segment 214 largely resembles the segment casting 400.

Figure 12:
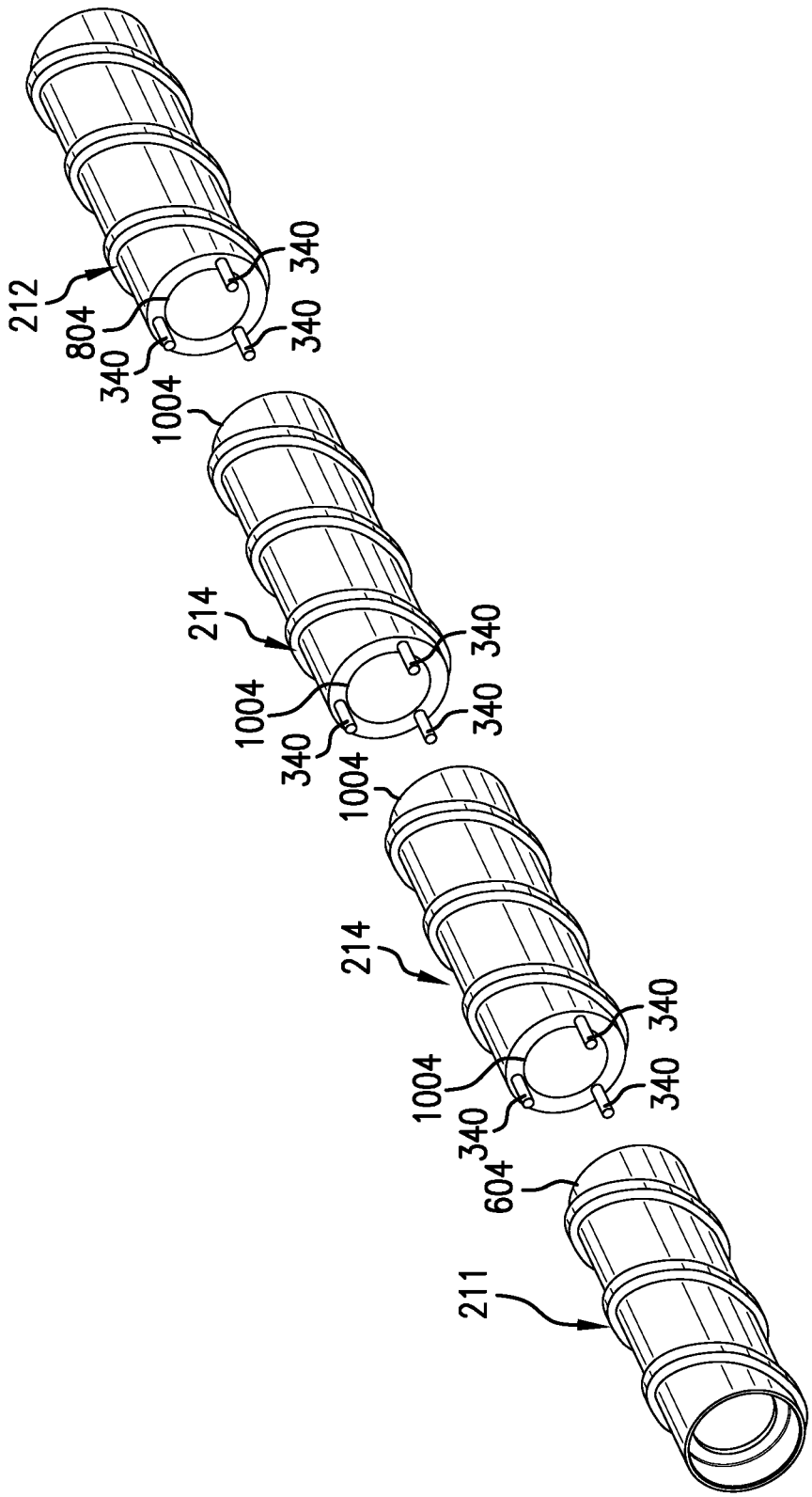
FIG. 12 is an exploded view of the follower roll of FIG. 2 illustrated with the first end segment, the second end segment, and a pair of middle segments between the end segments.

To assemble the cylinder 210, and referring now to FIG. 12 as well, the segments 211, 212, 214 can be aligned so their end faces 604, 804, 1004 face each other. To keep the segments rotationally locked together, a dowel pin 340 may be placed in some of the pin openings 603, 803, 1003 and the segments 211, 212, 214 brought together so a dowel pin 340 is placed in two respective pin openings 603, 803, 1003 of adjacent segments, as best illustrated in FIGS. 3A and 3C. The connector 220 can be placed in the wall openings 217, 218, 223 of the segments 211, 212, 214, which may be aligned together, and the end compressors 221, 222 of the connector 220 brought into contact with the respective interior walls 215, 216 to force the end segments 211, 212 toward each other and form the cylinder 210. The bearing and cap assemblies 311, 312 may then be mounted in their respective mounting grooves 601, 602, 801, 802 to cap the ends 313, 314 of the cylinder 210 and form the roll 200.

The cylinder 210 may be formed by holding together the end segments 211, 212 with a varying number of middle segments 214. In some embodiments, each of the segments 211, 212, 214 has the same length, due to being formed from a common segment casting 400. The length of each segment 211, 212, 214 may be, for example, 1 foot (30.5 cm). When each segment 211, 212, 214 has a length of 1 foot, a cylinder with a length of 3 feet can be formed by the pair of end segments 211, 212 held together with one middle segment 214, a cylinder with a length of 4 feet can be formed by the pair of end segments 211, 212 held together with two middle segments 214, a cylinder with a length of 5 feet can be formed by the pair of end segments 211, 212 held together with three middle segments 214, etc. Thus, it should be appreciated that the roll 200 provided in accordance with the present disclosure is a modular system that can be formed to have many different lengths using similar parts.

Figure 13:
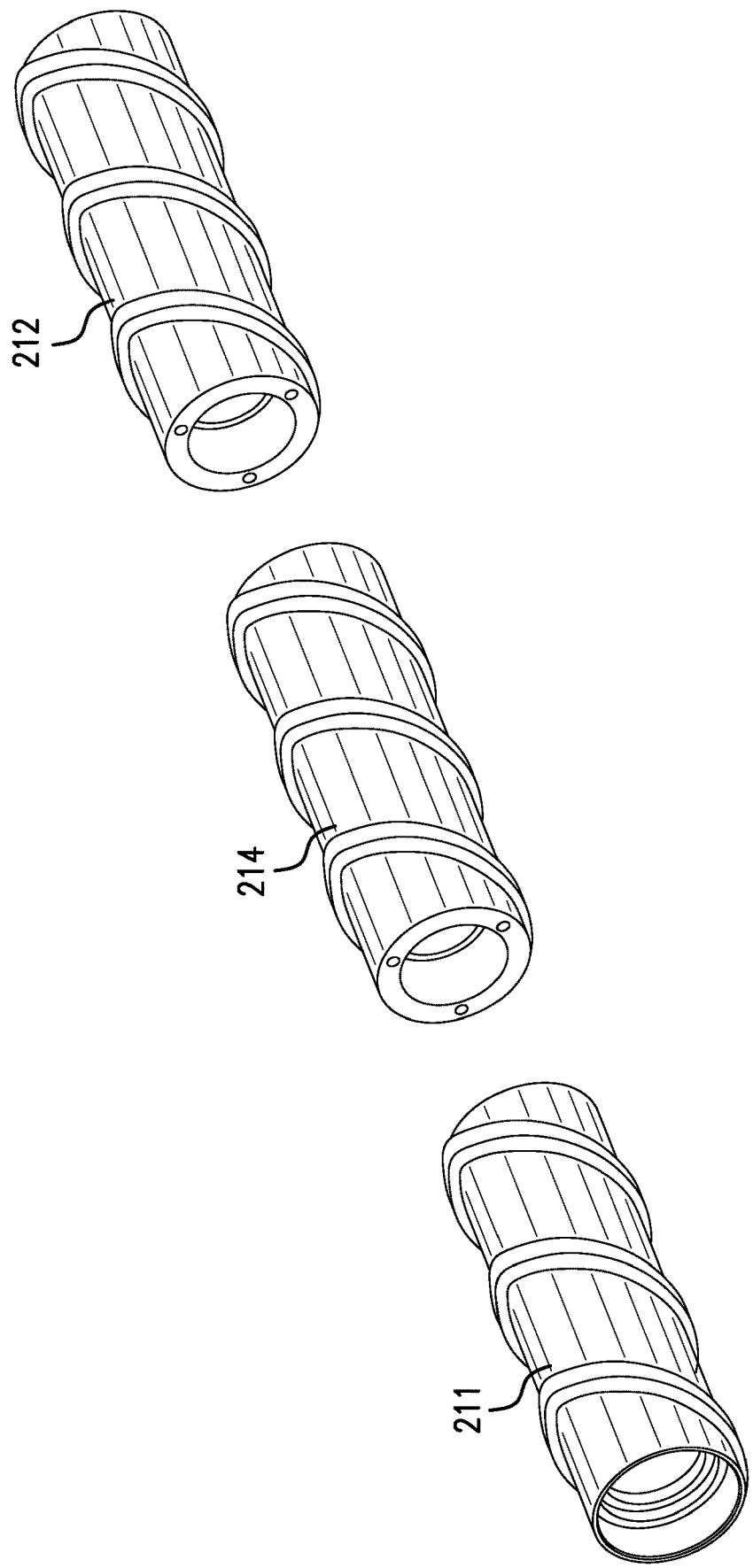
FIG. 13 is an exploded view of another exemplary embodiment of a follower roll that includes a pair of end segments and one middle segment between the end segments, provided in accordance with the present disclosure.

While the follower roll 200 of FIGS. 2 and 3A-3C is illustrated with a pair of end segments 211, 212 held together with a pair of middle segments 214, it should be appreciated that the number of middle segments 214 may vary. For example, as illustrated in FIG. 13, only one middle segment 214 may be held between the end segments 211, 212. In some embodiments, no middle segments are held between the end segments 211, 212. Providing fewer or more middle segments 214 allows a length of the formed roll to be varied.

Unlike known rolls, the roll 200 provided according to the present disclosure is formed without welding the loops 230 to the cylinder 210. Forming the roll 200 without welds avoids stress concentration at the weld points, allowing for a roll with a smaller outer diameter to be used with relatively high lengths, such as 5 feet, while staying within rotational bending fatigue parameters. Further, the roll 200 can be produced economically by casting a common segment casting 400 that is further processed to produce each of the individual segments 211, 212, 214 that are used, especially when differing lengths for the roll are desired. Thus, the roll 200 described herein provides a suitable and economic way to lengthen a follower roll without having to increase the outer diameter of the roll.

Figure 14:
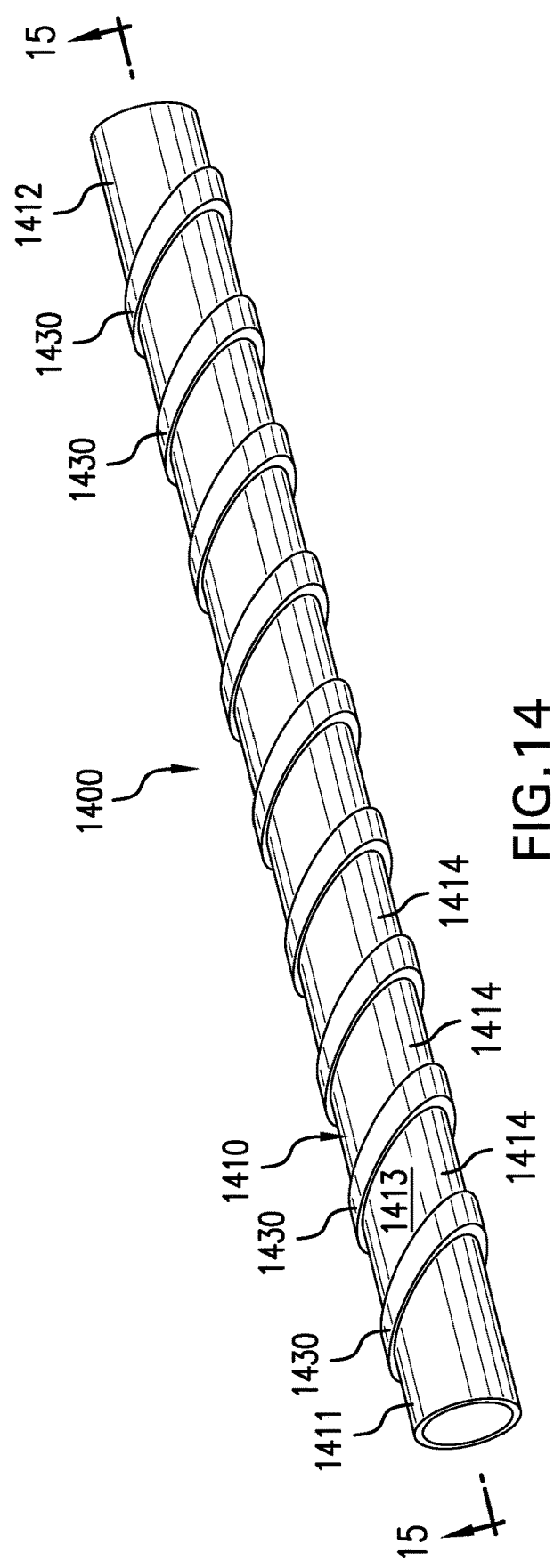
FIG. 14 is a perspective view of another exemplary embodiment of a follower roll provided in accordance with the present invention.
Figure 15:
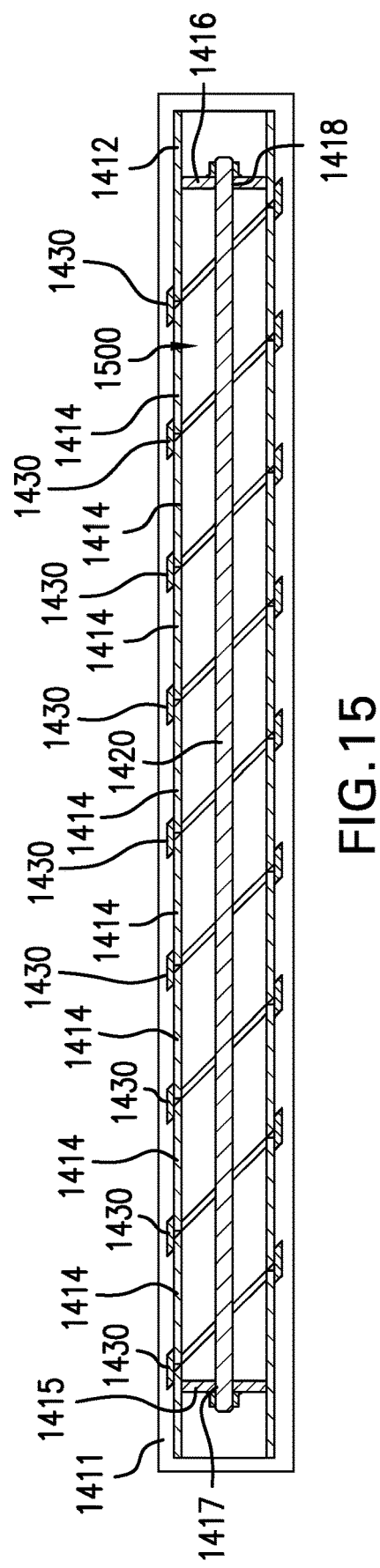
FIG. 15 is a cross-sectional view of the follower roll of FIG. 14 taken along line 15-15.

Referring now to FIGS. 14-15, another exemplary embodiment of a follower roll 1400 provided according to the present disclosure is illustrated. The follower roll 1400 also has a cylinder 1410 formed at least partially by a first end segment 1411 and a second end segment 1412 that are held together by a connector 1420 and a plurality of loops 1430 extending from an outer cylindrical surface 1413 of the cylinder 1410. The cylinder 1410 may also be formed by one or more middle segments 1414 that are held between the end segments 1411, 1412. The cylinder 1410 has an interior space 1500 and each of the end segments 1411, 1412 has a respective interior wall 1415, 1416 with a wall opening 1417, 1418 in the interior space 1500. The connector 1420 is placed in each of the wall openings 1417, 1418 and bears against the interior walls 1415, 1416 of each end segment 1411, 1412 to hold the end segments 1411, 1412, and optional middle segments 1414, together.

Unlike the previously described follower roll 200, which has loops 230 that are integrally formed with the segments 211, 212, 214, the loops 1430 of the roll 1400 are formed as loop segments that are held between adjacent segments 1411, 1412, 1414 to form the roll 1400. The loop segments 1430 may, for example, be sandwiched between adjacent segments 1411, 1412, 1414 due to the connector 1420 forcing the end segments 1411, 1412 towards each other. A loop segment 1430 may be held between the first end segment 1411 and one of the middle segments 1414, between each of the middle segments 1414, and between the second end segment 1412 and one of the middle segments 1414. The number of loop segments 1430 may be, for example, equal to the number of other segments (the end segments 1411, 1412 plus the number of middle segments 1414) minus one; in the illustrated embodiment of FIGS. 14-15, there are two end segments 1411, 1412, eight middle segments 1414, and thus nine loop segments 1430. It should be appreciated that the total number of segments 1411, 1412, 1414, 1430 forming the cylinder 1410 can be varied, as desired, so long as the cylinder 1410 includes at least two end segments 1411, 1412 and at least two loop segments 1430.

Figure 16:
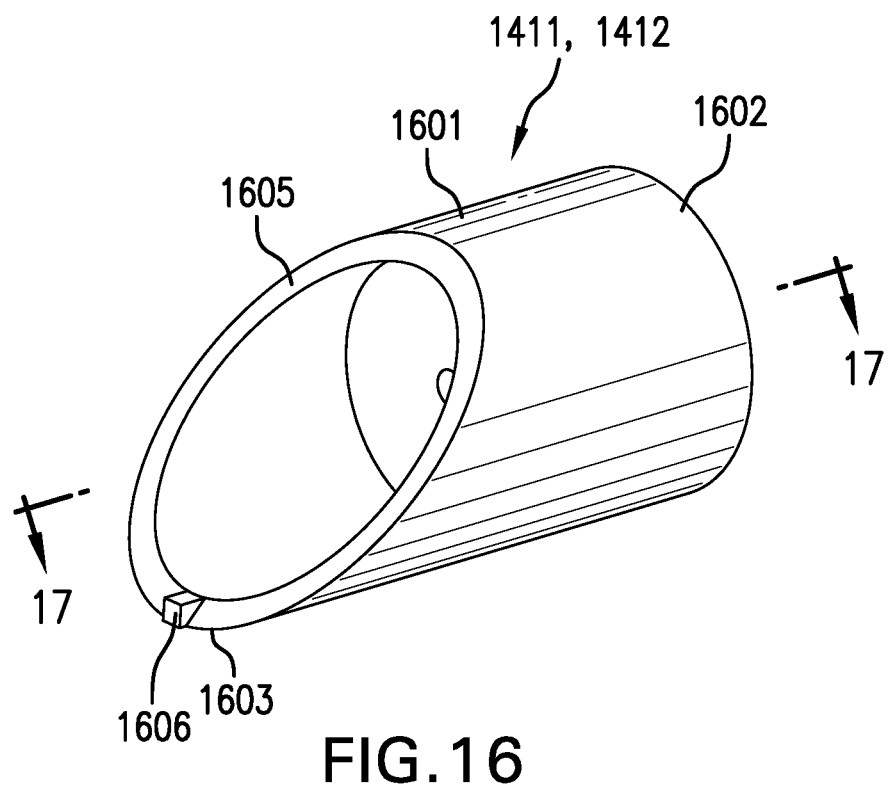
FIG. 16 is a perspective view of an exemplary embodiment of an end segment of the follower roll of FIG. 14.
Figure 17:
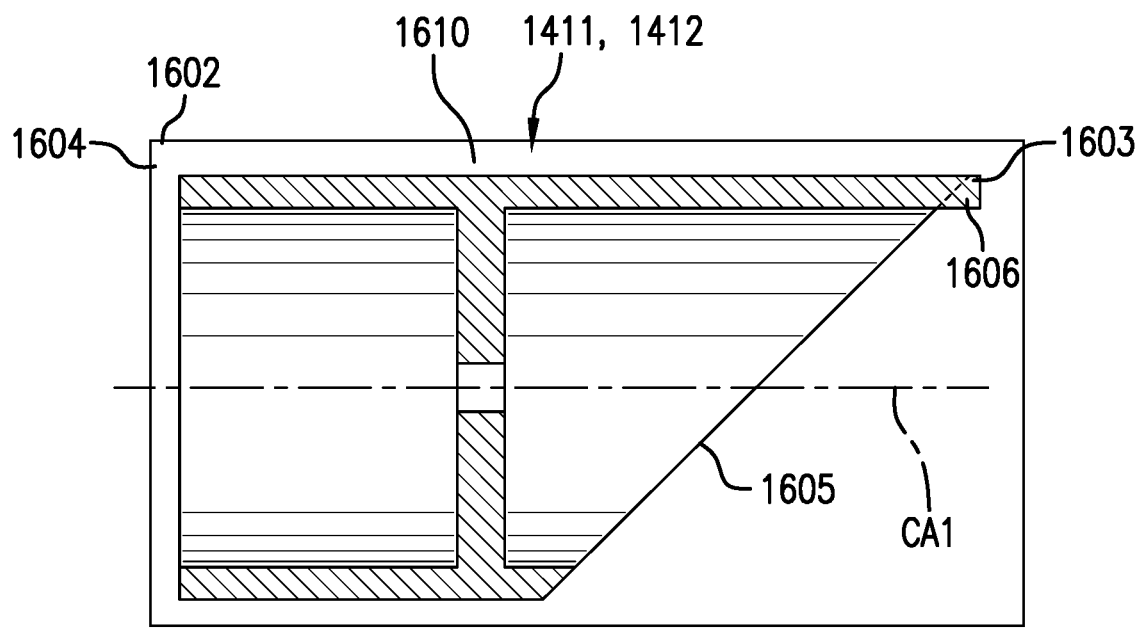
FIG. 17 is a cross-sectional view of the end segment of FIG. 16 taken along line 17-17.

Referring now to FIGS. 16-17, an exemplary embodiment of one of the end segments 1411, 1412 is illustrated in greater detail. The end segment illustrated in FIGS. 16-17 is referred to as the first end segment 1411 for convenience of description, but it should be appreciated from FIGS. 14-17 that the second end segment 1412 can be identical to the first end segment 1411. The first end segment 1411 has a generally cylindrical portion 1601 with a pair of ends 1602, 1603. One of the ends 1602 may have an end face 1604 defining a plane that is generally perpendicular to a cylinder axis CA1 of the cylindrical portion 1601. The other end 1603, in contrast, may have an end face 1605 defining a plane that is non-perpendicularly angled with respect to the cylinder axis CA1. The end face 1605 at the end 1603 may also have a locking feature 1606 that extends from the end face 1605, the significance of which will be described further herein.

Figure 18:
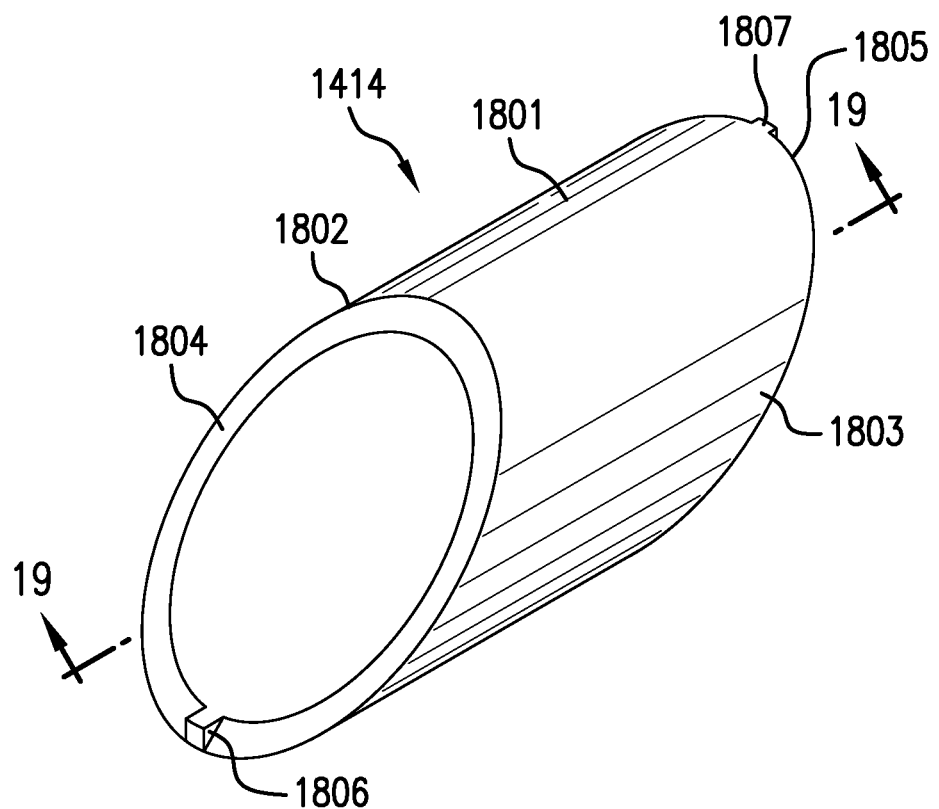
FIG. 18 is a perspective view of an exemplary embodiment of an optional middle segment of the follower roll of FIG. 14.
Figure 19:
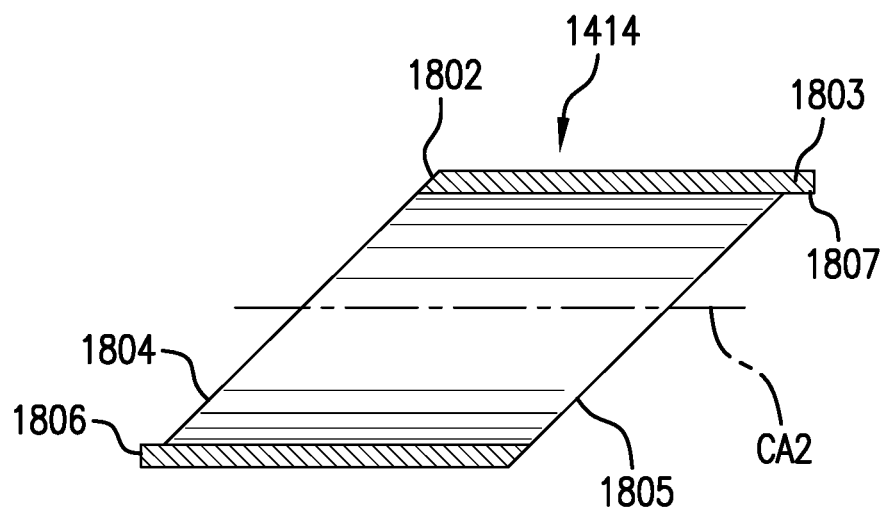
FIG. 19 is a cross-sectional view of the middle segment of FIG. 18 taken along line 19-19.

Referring now to FIGS. 18-19, an exemplary embodiment of one of the middle segments 1414 is illustrated in greater detail. Each of the middle segments 1414 of the cylinder 1410 may be formed identically to each other. The middle segment 1414 has a generally cylindrical portion 1801 with a pair of ends 1802, 1803. Each of the ends 1802, 1803 may have a respective end face 1804, 1805 defining a plane that is non-perpendicularly angled with respect to a cylinder axis CA2 of the cylindrical portion 1801, similarly to the end face 1605 of the end segments 1411, 1412. In some embodiments, the end faces 1605, 1804, 1805 of the segments 1411, 1412, and 1414 each extend at the same angle relative to the respective axes CA1, CA2 of the cylindrical portions 1601, 1801. Each of the end faces 1804, 1805 may also have a respective locking feature 1806, 1807 extending from the end face 1804, 1805, the significance of which will be explained further herein. The locking features 1806, 1807 may both extend generally parallel to the cylinder axis CA2 and have a similar shape, but in some embodiments do not extend coaxially with one another.

Figure 20:
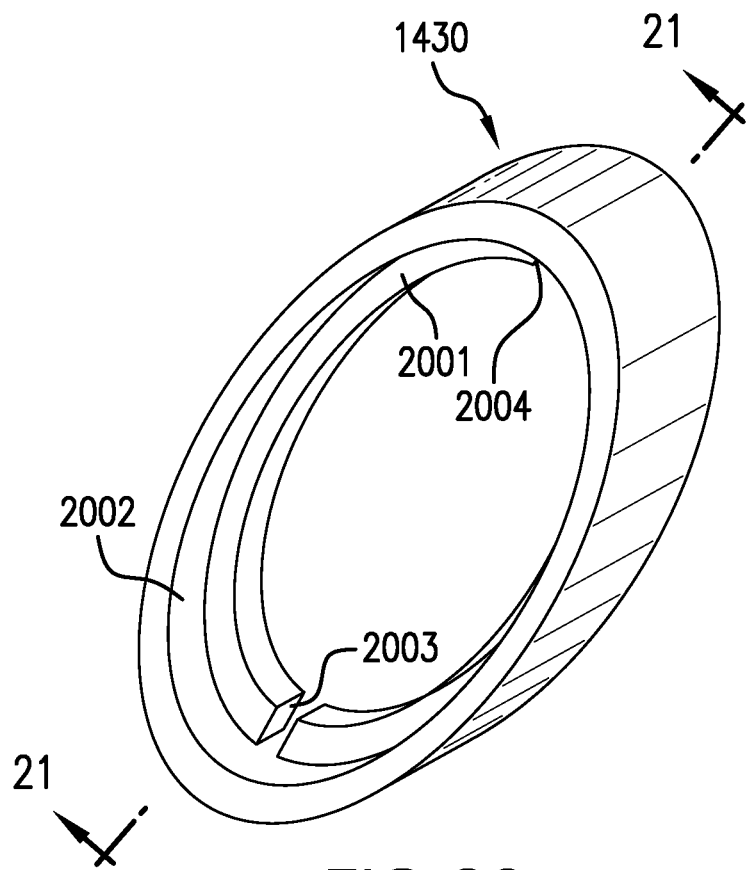
FIG. 20 is a perspective view of an exemplary embodiment of a loop segment of the follower roll of FIG. 14.
Figure 21:
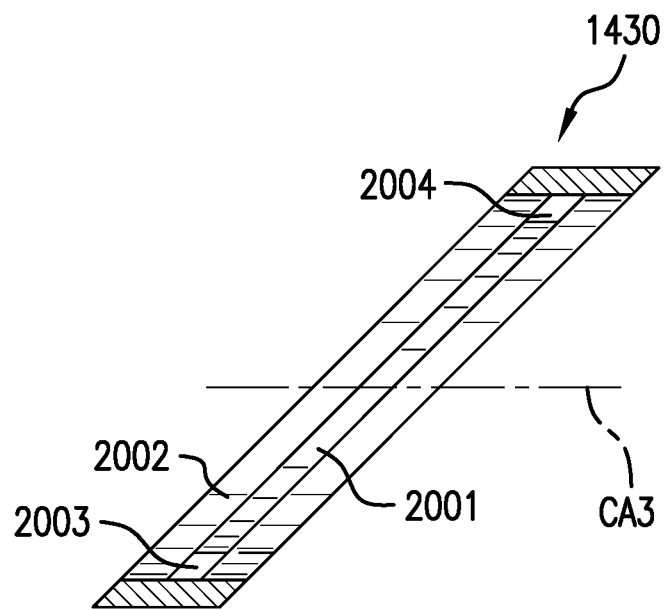
FIG. 21 is a cross-sectional view of the loop segment of FIG. 20 taken along line 21-21.

Referring now to FIGS. 20-21, an exemplary embodiment of one of the loop segments 1430 is illustrated in greater detail. Each of the loop segments 1430 of the roll 1400 may be identical to each other. The loop segment 1430 may be formed as an angled portion of a cylinder and define a plane, relative to a central axis CA3, that extends at the same angle, relative to the central axis CA3, that the end faces 1605, 1804, 1805 extend relative to their respective axes CA1, CA2. The loop segment 1430 may include an interior ring 2001 on an inner circumferential surface 2002 that extends along an inner circumference of the loop segment 1430. The interior ring 2001 may have one or more openings 2003, 2004 formed therein that are sized and shaped to accept the locking features 1606, 1806, 1807 of the other segments 1411, 1412, 1414, as will be described further herein.

To form the roll 1400, one of the loop segments 1430 is placed over the end 1603 of each end segment 1411, 1412 so the end face 1605 of each end segment 1411, 1412 bears against the interior ring 2001 of the loop segment 1430 and the locking feature 1606 is placed in one of the openings 2003, 2004 of the interior ring 2001. One or more middle segments 1414 may then be placed between the loop segments 1430 so the end faces 1804, 1805 bear against the interior rings 2001 and the locking features 1806, 1807 are placed in the other of the openings 2003, 2004. If multiple middle segments 1414 are included, loop segments 1430 may also be placed between each adjacent middle segment 1414 so the end faces 1804, 1805 of each middle segment 1414 bear against one of the interior rings 2001 with the locking features 1807, 1806 placed in a respective one of the openings 2003, 2004 of the loop segments 1430. Once the desired number of segments 1411, 1412, 1414, 1430 are in place, the connector 1420 may be placed in the wall openings 1417, 1418 of the interior walls 1415, 1416 of the end segments 1411, 1412 so the connector 1420 bears on the interior walls 1415, 1416 to force the end segments 1411, 1412 toward each other and hold the segments 1411, 1412, 1414, 1430 together to form the roll 1400.

From the foregoing, it should be appreciated that the roll 1400 provides a follower roll with loops that are not welded to a cylinder. The roll 1400 thus provides similar improvements over known rolls that the previously described roll 200 provides. Further, the loops 1430 of the roll 1400 can be formed separately from the other segments 1411, 1412, 1414, which may simplify manufacturing by eliminating the need to cast the loops 1430 integrally with the other segments 1411, 1412, 1414.

Referring now to FIG. 22, an exemplary embodiment of a method 2200 of forming a roll 200, 1400, such as a follower roll, for an agricultural baler is illustrated. The method 2200 includes holding 2201 a pair of end segments 211, 212, 1411, 1412 together with a connector 220, 1420 to form a cylinder 210, 1410. The connector 220, 1420 is placed inside wall openings 217, 218, 1417, 1418 formed in interior walls 215, 216, 1415, 1416 of the end segments 211, 212, 1411, 1412 so the connector 220, 1420 bears on the interior walls 215, 216, 1415, 1416 to hold the end segments 211, 212, 1411, 1412 together. Loops 230, 1430 extend from an outer cylindrical surface 213, 1413 of the cylinder 210, 1410. In some embodiments, the loops 230 are integrally formed with the end segments 211, 212. In some embodiments, the loops 1430 are formed as loop segments that are held between the end segments 1411, 1412. Optionally, one or more middle segments 214, 1414 may be placed 2202 between the end segments 211, 212, 1411, 1412 prior to holding 2201 the end segments 211, 212, 1411, 1412 together with the connector 220, 1420 so the middle segments 214, 1414 are held together with the end segments 211, 212, 1411, 1412.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A roll for an agricultural baler, comprising:
a cylinder comprising an outer cylindrical surface and an interior space, the cylinder being at least partially formed by a first end segment and a second end segment held together, the first end segment and the second end segment each comprising a respective interior wall comprising a wall opening in the interior space;
a connector having opposing ends, each of the opposing ends placed in the wall openings of the respective interior walls of the first end segment and the second end segment and bearing against the respective interior walls of the first end segment and the second end segment to hold the first end segment and the second end segment together;
a bearing and cap assembly placed at each of opposing ends of the cylinder adjacent to the respective interior walls, wherein each of the bearing and cap assemblies is separately spaced from the respective interior walls and respective ones of the ends of the connector; and
a plurality of loops extending from the outer cylindrical surface.

2. The roll of claim 1, wherein the cylinder further comprises at least one middle segment held between the first end segment and the second end segment.

3. The roll of claim 2, wherein the first end segment, the second end segment, and the at least one middle segment each comprises a cylindrical portion and a loop portion integrally formed with the cylindrical portion.

4. The roll of claim 3, wherein the cylindrical portion and the loop portion are an integral casting.

5. The roll of claim 3, wherein each of the cylindrical portions of the first end segment, the second end segment, and the at least one middle segment comprises an end face with a pin opening formed therein.

6. The roll of claim 5, further comprising a first dowel pin placed in a respective pin opening of both the first end segment and the at least one middle segment and a second dowel pin placed in a respective pin opening of both the second end segment and the at least one middle segment.

7. The roll of claim 3, wherein the at least one middle segment comprises a middle interior wall comprising a middle wall opening in the interior space, the connector extending through the middle wall opening.

8. The roll of claim 2, further comprising a first loop segment held between the first end segment and the at least one middle segment and a second loop segment held between the second end segment and the at least one middle segment, the first loop segment and the second loop segment each comprising at least one of the plurality of loops.

9. The roll of claim 8, wherein the first end segment, the second end segment, and the at least one middle segment comprise at least one end face, the first loop segment and the second loop segment each comprising an interior ring that bears against a respective end face of the first end segment, the second end segment, and the at least one middle segment.

10. The roll of claim 8, wherein the first end segment and the second end segment are identical.

11. An agricultural baler, comprising:
a chassis;
a baling chamber carried by the chassis; and
a roll disposed in the baling chamber, the roll comprising:
a cylinder comprising an outer cylindrical surface and an interior space, the cylinder being at least partially formed by a first end segment and a second end segment held together, the first end segment and the second end segment each comprising a respective interior wall comprising a wall opening in the interior space;
a connector having opposing ends, each of the opposing ends placed in the wall openings of the respective interior walls of the first end segment and the second end segment and bearing against the respective interior walls of the first end segment and the second end segment to hold the first end segment and the second end segment together;
a bearing and cap assembly placed at each of opposing ends of the cylinder adjacent to the respective interior walls, wherein each of the bearing and cap assemblies is separately spaced from the respective interior walls and respective ones of the ends of the connector; and
a plurality of loops extending from the outer cylindrical surface.

12. The agricultural baler of claim 11, wherein the cylinder further comprises at least one middle segment held between the first end segment and the second end segment.

13. The agricultural baler of claim 12, wherein the first end segment, the second end segment, and the at least one middle segment each comprises a cylindrical portion and a loop portion integrally formed with the cylindrical portion.

14. The agricultural baler of claim 13, wherein the cylindrical portion and the loop portion are an integral casting.

15. The agricultural baler of claim 13, wherein each of the cylindrical portions of the first end segment, the second end segment, and the at least one middle segment comprises an end face with a pin opening formed therein.

16. The agricultural baler of claim 15, further comprising a first dowel pin placed in a respective pin opening of both the first end segment and the at least one middle segment and a second dowel pin placed in a respective pin opening of both the second end segment and the at least one middle segment.

17. The agricultural baler of claim 13, wherein the at least one middle segment comprises a middle interior wall comprising a middle wall opening in the interior space, the connector extending through the middle wall opening.

18. The agricultural baler of claim 12, further comprising a first loop segment held between the first end segment and the at least one middle segment and a second loop segment held between the second end segment and the at least one middle segment, the first loop segment and the second loop segment each comprising at least one of the plurality of loops.

19. The agricultural baler of claim 18, wherein the first end segment, the second end segment, and the at least one middle segment comprise at least one end face, the first loop segment and the second loop segment each comprising an interior ring that bears against a respective end face of the first end segment, the second end segment, and the at least one middle segment.

20. The agricultural baler of claim 18, wherein the first end segment and the second end segment are identical.

\* \* \* \* \*